Figure 1:
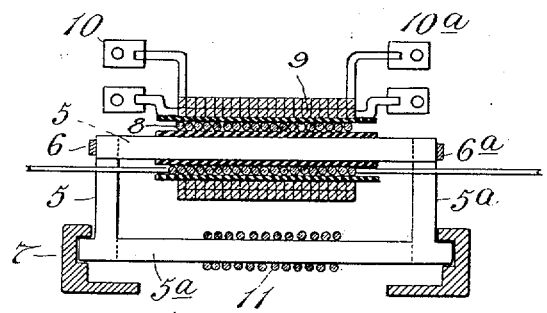

G. A. BURNHAM.
SERIES TRANSFORMER.
APPLICATION FILED FEB. 8, 1911.

1,017,737.

Patented Feb. 20, 1912.
3 SHEETS—SHEET 1.

Witnesses:
Edward Rowland
Edmund O. Dubocq

Inventor
GEORGE A. BURNHAM
By his Attorneys
Edwards, Sager & Wooster

G. A. BURNHAM.
SERIES TRANSFORMER.
APPLICATION FILED FEB. 8, 1911.

1,017,737.

Patented Feb. 20, 1912.

3 SHEETS—SHEET 2.

Witnesses:
Edward Rowland
Edmund O. Duboc.

Inventor
GEORGE A. BURNHAM
By his Attorneys
Edwards, Sager & Wooster.

G. A. BURNHAM.
SERIES TRANSFORMER.
APPLICATION FILED FEB. 8, 1911.

1,017,737.

Patented Feb. 20, 1912.

3 SHEETS—SHEET 3.

Witnesses:
Edward Rowland
Edmund O. Dubocq.

Inventor
George A. Burnham
By his Attorneys
Edwards, Sager & Wooster

UNITED STATES PATENT OFFICE.

GEORGE AUGUSTUS BURNHAM, OF CLIFTONDALE, MASSACHUSETTS, ASSIGNOR TO SEARS B. CONDIT, JR., OF BROOKLINE, MASSACHUSETTS.

SERIES TRANSFORMER.

1,017,737.    Specification of Letters Patent.    Patented Feb. 20, 1912.

Application filed February 8, 1911. Serial No. 607,368.

*To all whom it may concern:*

Be it known that I, GEORGE A. BURNHAM, a citizen of the United States, residing at Cliftondale, in the county of Essex and State of Massachusetts, have invented certain new and useful Improvements in Series Transformers, of which the following is a full, clear, and exact specification.

This invention relates to series transformers, the object being to provide a device of the kind which will maintain its ratio of transformation more uniform with variation of primary current than those heretofore available.

Series transformers are usually employed where working potential is so high that bringing the high tension wires to the front of the switchboard not only complicates switchboard construction, but also brings about a condition which is dangerous to life. They are generally used to furnish current for operating various indicating or recording instruments and for operating trip coils of circuit breakers and other protective devices, the proper operation of which depends mainly upon the accuracy of the current transformer.

The transformer consists of an iron circuit having a few turns of wire linking said iron circuit which is connected to the high tension wires of the distribution system. The secondary coil of generally a greater number of turns also links the iron circuit and is entirely insulated from the primary winding. The ratio of transformation is accomplished by varying the relation of the number of primary or secondary turns.

In the circuit of the primary winding there may be an extremely high voltage, but in the secondary winding the potential is very low, the voltage being only sufficient to force the proper amount of current through the indicating or recording instruments, thus the dangerous high voltage is kept away from the switchboard proper and the low voltage employed to actuate the moving elements of the various indicating or recording instruments.

The primary winding consists of two sections which may either be connected in series or multiple according to primary load conditions and in either case within the proper load range of the transformer the secondary current will be the same. This feature is especially useful and desirable in keeping down the error in transformation. A further advantage is that a partially loaded feeder circuit may be provided with a double wound current transformer with the coils in series and when full load is obtained the coils may be connected in multiple and the secondary currents will remain exactly the same as in the previous case. Heretofore current transformers have had such characteristics that the error increases rapidly at light load and consequently causes inaccurate readings in the recording or indicating devices, and furthermore the ratio of transformation and the character of the ration curve is materially changed by a variation in the character of the load on the secondary of the transformer.

My invention tends to make the ratio curve the same slope for all characters of load and for a load of a given nature, such as a highly inductive load, my curve of transformation tends to approach nearer a straight line with varying current in the primary than any other type of transformer of this character. I bring about this desirable result by providing a closed circuit and preferably an auxiliary circuit of comparatively low resistance encircling another part or parts of the magnetic circuit.

The theory of the current transformer is very involved and not generally thoroughly understood, but the favorable results I obtain by use of the auxiliary closed circuit is probably due to the fact that the effective flux is nearer constant at all loads than if the short circuited coil is not employed. I do not wish to confine myself, however, to any particular theory regarding the operation of this transformer. The fact remains that the series transformer, constructed as I have indicated, will permit a wide range of current variation in its primary and secondary without materially altering the ratio of transformation and furthermore I am able to produce practically the same curve with the same ratio of transformation with loads of different character which has not been obtained to my knowledge in the past. This is a new result in alternating current practice and one of much importance to the switchboard engineer, station operators, consumers and producers of electrical energy.

It is also important to note that if any damage occurs to the secondary of the current transformer a sudden rise of potential cannot occur because of the short circuited compensating winding.

Furthermore my invention aims to protect the current transformer from having high potential surges set up on occurrence of an open circuit in the secondary which heretofore has been considered as exceedingly dangerous to the distribution system and the apparatus connected therewith. From the various figures it will be noted that with my device the transformer is either entirely disconnected from the circuit or the secondary is short circuited if such conditions arise.

My invention, therefore, consists in maintaining the ratio of transformation of a series transformer by means of an auxiliary closed electric circuit of low resistance around its core which comprises means for automatically protecting the transformer in case its secondary circuit rises unduly in voltage.

The several features of novelty will be hereinafter more fully described and will be definitely indicated in the claims.

Figure 3:
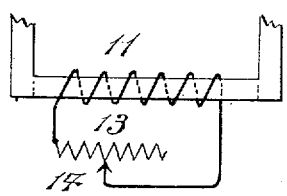
Figure 2:
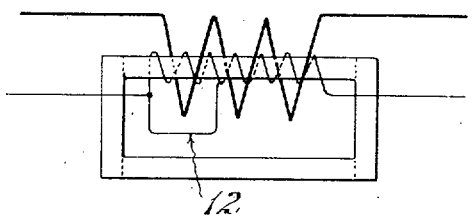
Figure 4:
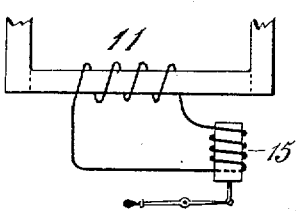
Figure 5:
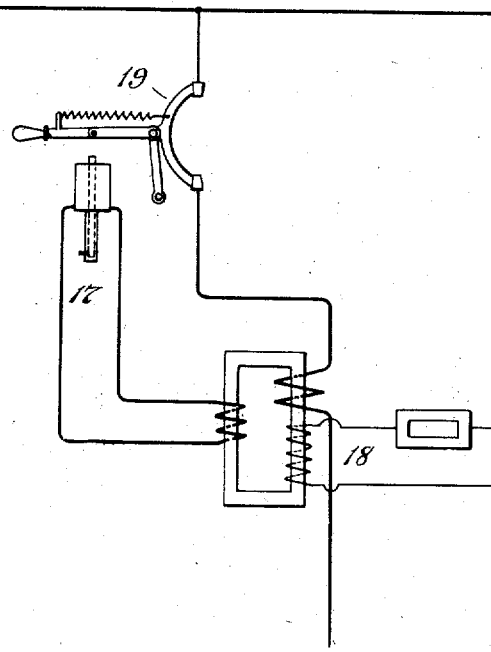
Figure 6:
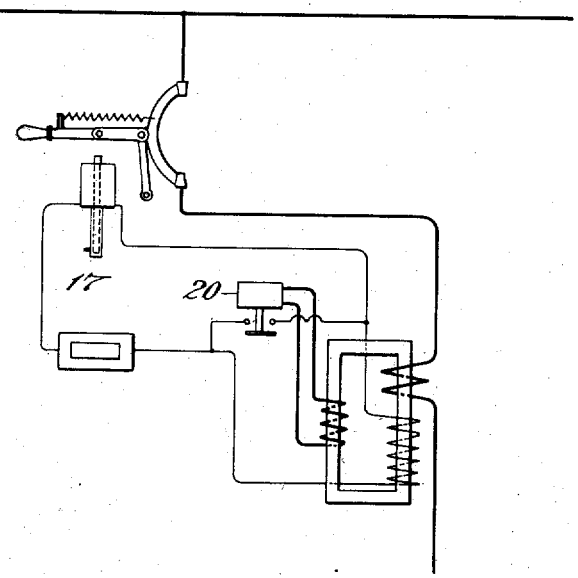
Figure 7:
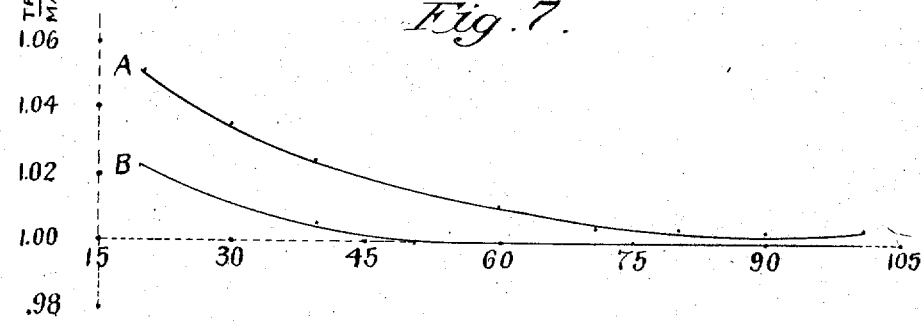
Figure 9:
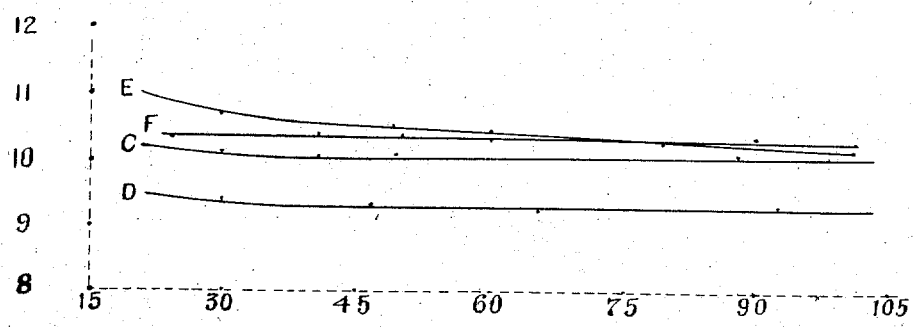
Figure 8:
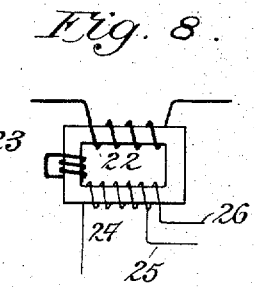

In the accompanying drawings which illustrate my invention Figure 1 is a sectional view of a transformer embodying a compensating coil according to my improvement. Fig. 2 is a diagrammatic view of a modified improvement in which part of the secondary is closed on itself to form the compensating coils. Fig. 3 shows a compensating coil of variable resistance. Fig. 4 shows a variable adjustment of the compensating coil by means of inductance. Fig. 5 shows means for preventing the transformer from damage by automatically cutting it out of circuit. Fig. 6 shows means for closing the secondary and protecting the transformer in case its secondary becomes opened and for cutting out the transformer if the trouble is not automatically corrected. Fig. 7 shows the relative efficiency in maintaining the ratio of transformation of my improved transformer and those heretofore employed. Fig. 8 shows how my transformer may be connected for a different load. Fig. 9 shows curves taken with the same transformer with and without the compensating coil.

The load circuit of a series transformer commonly includes indicating and recording ammeters and watt meters and trip coils of circuit breakers involving particularly in the case of recording instruments a variable load; moreover the number of these instruments and therefore the load is widely different on different switchboards and also differs from time to time when instruments are temporarily cut out of service or their circuits are varied, and as series transformers are a staple article of production the same device does not properly meet the varying uses it is put to. When the primary load is heavy it is usual to connect the two primary windings in parallel and when light in series. Such a provision does not however satisfy the condition of maintaining the ratio constant under changes of load, especially if partly or wholly of an inductive character, the ratio being altered with each load variation so that the secondary voltage is not uniform and therefore the measuring instruments no longer read correctly and the trip coils no longer act according to their predetermined calibration. The error is easily seen by an inspection of the curve A of Fig. 7 which shows graphically how the ratio is altered by the usual construction of series transformers, introducing an error of more than 4 per cent. from small to full load. This is a serious defect as the measuring instruments are no longer reliable in their indications and the change is so great that if the series transformer is applied to trip coils they do not respond to the calibrated loads. With my structure, however, the ratio is preserved practically constant the percentage of error being reduced to about one per cent. for load changes from 30 to 100 per cent. and over as will be seen from curve B. These two curves represent a comparative test of a standard series transformer and one constructed according to my improvements.

As indicated on Fig. 9 the numerals on the axis of ordinates at the left of the diagram represent the true ratio divided by the marked ratio as noted at the top of the diagram which really indicates the percentage of error in the transformer; if the ratio had been accurate throughout the entire range of current it would be represented by a straight line coinciding with the ordinate passing through unity. The figures on the abscissæ represent the percentage of full load current.

In Fig. 1 is shown a series transformer embodying my construction.

5 5$^a$ represents a closed magnetic circuit of laminated iron held by iron clamps 6 6$^a$ and supported on a base 7. The core 5 is insulated and a secondary winding 8 wound on the insulation. Another layer of insulation is then applied over the secondary winding and the primary winding 9 then applied on the outside. This may be in the form of two superposed layers each having terminals 10, 10$^a$ which may be connected in series or parallel. The drop of potential over the primary winding is small and the consecutive turns need not be insulated to any great amount. In practice in the case of a 10 or 20 to 1 ratio of transformation I make the primary of two layers of fifteen turns each and give the secondary 240 turns. The compensating coil which comprises a tertiary circuit is indicated at 11. This is of low resistance and may be variously constructed. I have attained excellent results with 15 turns of comparatively coarse wire say No. 16 B. & S. gage; it might be of different resistance, a closed copper tube might be employed in some cases, or the resistance might be varied inductively or non-inductively, or in some cases a part of the secondary might be short circuited on itself as shown at 12 in Fig. 2.

Fig. 3 shows diagrammatically a method of non-inductive variation of the coil resistance a resistance 13 being connected in the compensating circuit and an adjustable contact 14 being provided to vary the point of connection with the resistance and thus alter the current in the compensating winding. In Fig. 4 a coil 15 is included in circuit with the compensating coil and a movable iron core mounted within the coil 15 to alter the impedance of the compensating circuit. The compensating coil may be used to supply a trip coil directly as shown at 17 in Fig. 5, the secondary coil being used as usual on the measuring instruments as shown at 18 in said figure or the secondary may supply both the measuring instruments and the trip coils as shown in Fig. 6. In the former case the trip coil will act to cut out the series transformer by opening the circuit breaker 19 in case of damage to the secondary circuit of the transformer, since any substantial change of resistance or a break in the secondary circuit will increase the current in the trip coil and cut out the transformer. Thus the transformer is saved from being burned out by excessive increase of voltage in its secondary and resultant break down by overheating.

In Fig. 6 I have shown an arrangement by which trip coils on the switchboard may be used to open the circuit in case of over load in the primary circuit and may also be protected from excessive rise of voltage in the secondary of the transformer. In this case the secondary winding may be placed in circuit with the trip coil and if desired with other load, and a small relay 20 may be put in the compensating circuit; if the transformer primary is excessively loaded the increased current in the secondary will cut it out by operating the trip coil and opening the circuit breaker 21; or if there should be a break of the secondary circuit or any other trouble that would create an improper rise of secondary voltage, the relay will close the secondary circuit and prevent damage to the transformer.

Referring to Fig. 9, I have shown two sets of curves, namely, C D and E F; the two former curves taken from a transformer using my compensating coil and the latter a transformer omitting the compensating coil. Both of these transformers were operated on a load of the same character and a comparison of the two curves will show the advantage of the compensating coil.

Curve C shows the ratio of transformation with the trip coil in the circuit. Curve D shows the ratio of transformation with the trip coil out of circuit. It will be noted that these two curves are parallel, there being practically no error in slope at corresponding points throughout the total length of the curves.

Curve E shows the ratio of transformation of the same transformer without the compensating coil with the trip coil in the circuit and curve F shows the ratio of transformation with the trip coil out of the circuit. Comparing curves E and F it is easily seen that the character and also the ratio of transformation of the two curves are greatly effected by the varying load conditions.

The numerals on the axis of ordinates at the left of the diagram indicate the theoretical ratio and those on the axis of the abscissæ the percentage of full load, the variation from the horizontal showing the change of ratio under the different operating conditions described.

Fig. 8 illustrates a device whereby the curves of ratio can be made to coincide when it is desired to make any change in the character of the secondary load of the current transformer.

22 is a primary winding of the current transformer; 23, compensating coil; 24, the secondary winding linking a magnetic circuit, 27. It will be noted that a tap (25) is brought out from the secondary (24) and also a tap (26).

The curve C of Fig. 9 was obtained by connecting the load, consisting of instruments and relay, to the tap 25. With the coil disconnected the curve of transformation is shown in D. By connecting this same load to the tap 26 the curve D becomes C and it will now be evident that by this type of transformer we may obtain a curve which is nearer the theoretical ratio line and we may also produce the same curve for variations in the character of the load, as well as for difference in the current values of loads of the same character.

Having thus described my invention, what I claim as new and desire to secure by Letters Patent is:—

1. A series transformer having a primary winding, a secondary winding, and a closed circuited coil to preserve its ratio of transformation under change of load.

2. A series transformer having a primary winding, a secondary winding, and an adjustable short circuited compensating coil to preserve the ratio of transformation of the transformer.

3. A series transformer having a primary winding, a secondary winding, a closed circuited compensating coil to preserve the ratio of transformation of the transformer, and a variable impedance in the compensating circuit.

4. A series transformer having a primary winding, a secondary winding and a closed circuited compensating winding placed over a different part of the core to increase the magnetic potential across the air gap and preserve the ratio of transformation of the transformer.

5. A series transformer having primary and secondary windings and a closed circuited tertiary winding, whereby the ratio of transformation under change of secondary load is practically uniform.

6. A series transformer provided with means for preserving its ratio of transformation under wide ranges of secondary load variation comprising a closed circuited auxiliary coil around its magnetic circuit.

7. A series transformer provided with a short circuited compensating coil to maintain the effective magnetic flux approximately constant over a wide range of secondary load variation, whereby the ratio of transformation is preserved practically constant.

8. A series transformer provided with a closed circuited compensating coil around its magnetic circuit, and a secondary winding provided with a plurality of taps to different loads.

In testimony whereof I affix my signature in presence of two witnesses.

GEORGE AUGUSTUS BURNHAM.

Witnesses:
  A. C. NELSON,
  E. C. WATERHOUSE.